Dec. 28, 1948.  C. J. CRANE ET AL  2,457,130
BLIND FLYING AND BLIND LANDING SYSTEM
FOR AVIATION FLIGHT TRAINERS
Filed Feb. 26, 1940  5 Sheets-Sheet 1

INVENTORS
CARL W. MULLER
RAYMOND K. STOUT
GEORGE V. HOLLOMAN
CARL J. CRANE
ATTORNEYS

Patented Dec. 28, 1948

2,457,130

UNITED STATES PATENT OFFICE 2,457,130

BLIND FLYING AND BLIND LANDING SYSTEM FOR AVIATION FLIGHT TRAINERS

Carl J. Crane and George V. Holloman, Dayton, Carl W. Muller, Osborn, and Raymond K. Stout, Dayton, Ohio Application February 26, 1940, Serial No. 320,879

49 Claims. (Cl. 35—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a system for instructing students in blind flying and landing in aviation ground trainers of the type of the Link Trainer, and more particularly relates to the provision of equipment for use with the record table of an aviation ground trainer, such that conditions simulating actual blind instrument flying and landing of aircraft can be duplicated in a realistic manner.

Aviation ground trainers of a type suitable for use with the invention are illustrated and described in United States Patents No. 1,825,462 and No. 2,099,857, granted to Edwin A. Link, Jr.

Suitable automatic course recorders for use with aviation ground trainers are illustrated and described in United States Patent 1,293,747, granted to Hannibal C. Ford, and in British Patent 484,243, granted February 22, 1937, to Edwin A. Link, Jr.

In aviation ground trainers as heretofore known in the art, the trainer is used in conjunction with an automatic course recorder which traces the simulated flight path of the trainer upon a record map sheet. Such a recorder essentially comprises a frame supported by at least three rollers, all of which are steerable by means of interconnecting gearing and two of the rollers being driven at a speed proportional to the simulated ground speed of the trainer by constant speed electric motors, though this constant speed may be adjusted for any desired value. The third roller is utilized as a marking means, which when inked traces the recorder path on a record sheet or map. The means for steering the rollers is connected to an electrical Selsyn receiver S mounted on the recorder frame, the "selsyn" receiver S being electrically connected by conductors $S^1$ to a Selsyn transmitter $S^2$ rotated directly by the trainer as it changes its azimuth heading. The plane of rotation of the recorder rollers is thus changed through the same angle and in the same directional sense as any change in the azimuth heading of the trainer. The recorder thus traces a path on the record sheet equivalent to the simulated flight of the trainer with respect to the surface of the earth.

In order to simulate flying on a radio range beacon course, the instructor is provided with a manually controlled electrical signal system by which aural or visual signals may be received by the student in the trainer cockpit. The instructor manually controls a switch by which he may transmit the conventional A, N, and On Course signals to the student, and he transmits a signal of a character dependent upon the instant location of the recorder tracer relative to a radio range course drawn on the record map. As the recorder approaches the simulated range station on the record map, the instructor, by means of a further manual control, must increase the signal intensity toward a maximum value; and when the recorder passes over the simulated cone of silence on the record sheet, the instructor must cut off the signals and rapidly change the signal character as the recorder passes out of the cone of silence onto another radio range leg, preparatory to the making of a simulated landing. The instruction is thus definitely limited by the skill of the instructor in manipulating the signal controls, and frequent errors cause a lack of confidence in the apparatus on the part of the student.

In order to eliminate the manual control of the signalling system with its attendant personal factor errors, we have illustrated, described, and claimed in our co-pending application No. 320,878, filed February 26, 1940, "An automatic miniature radio range for student training," and the subject matter of this application forms a continuation in part of the said application No. 320,878. That application has since matured into Patent No. 2,444,477 dated July 6, 1948. In our above-identified application we have shown how an antenna array may be secured to the trainer record table in such a manner that when connected to a transmitter suitably keyed, an actual radio range beacon may be set up with reference to any desired point on the record table, which simulates the range station. A signal pick up antenna carried by the course recorder receives the A, N, or On Course signals and transmits the signals to a radio receiver mounted in the trainer cockpit. The reception of the proper radio range signal is thus dependent only on the position of the recorder pick up relative to the assumed range station on the recorder map table. The antenna array is so formed that the signal intensity increases as the range station is approached, and the radiation pattern in the vertical plane creates a realistic cone of silence over the simulated range station, making it possible to imitate flight conditions on an actual radio range beacon and relieving the instructor of the task of manually operating the signal system.

The invention provides a means for simulating blind landings with the ground trainer in accordance with either the Army Air Corps System or the Bureau of Standards System or modified forms thereof.

The Army Air Corps System of Blind Landing employs a pair of radio compass transmitting stations of a portable nature, each spaced at predetermined distances from the desired landing runway of an airdrome, and in addition to the radio compass transmitters each radio compass station is provided with a marker beacon transmitter which radiates a signal in the vertical plane and indicates that the aircraft is directly over the radio compass station. The airplane is equipped with a radio compass including a radio receiver, a fixed or a rotatable loop antenna connected thereto, and a marker beacon signal receiver. The pilot, by tuning in on the respective radio compass stations in a definite sequence, may align the airplane with the landing runway axis in a manner hereinafter more fully described with reference to the simulation of such an instrument landing in a flight trainer. After aligning the airplane with the landing runway, a descent is begun from an altitude of—say, 800 feet at the outer station at a constant rate of descent governed by the proper gliding speed of the particular airplane; and the altitude is checked when passing over the inner station, and if proper the descent is continued, using the directional gyro as a guide for directional control. The descent is continued until the altimeter indicates a predetermined altitude such that contact with the ground is imminent, and the throttle is then closed and contact with the runway is made shortly thereafter.

The Bureau of Standards System differs from the above-described system in that a localizer radio beam of the familiar radio range type is employed to directionally guide the airplane into alignment with the landing runway, the airplane using either aural or visual indications to maintain the localizer beam course. Marker beacon transmitters are employed in the same fashion as in the above-described Army System to locate predetermined points on the axis of the landing runway and spaced at known distances from the edge of the runway. A radio transmitter located on the airport radiates a radio beam having a definite pattern in the vertical plane such that a line of constant field intensity forms a curved glide path which is nearly tangent to the runway at the transmitter end. The airplane is equipped with a special receiver and indicator operative to indicate the deviation of the airplane in descent from the proper glide path. The glide path beam is followed in the descent until the landing is made, the throttle being closed after passing over the inner marker beacon transmitter. This system requires the use of three radio receivers—namely, the localizer beacon, marker beacon, and glide path receivers—as contrasted with the radio compass and marker beacon receivers required with the Army Air Corps System. A modified form of the Bureau of Standards System is known as the Lorenz System and is similar to the Bureau of Standards System, except that the glide path beam and the localizer beam are combined in a single unit, the radiation having special vertical and horizontal patterns such that both functions are served by the single beam. The marker beacon transmitters above described are also employed.

In carrying out an instrument landing in accordance with the Army Air Corps System, there is provided in accordance with the invention a special record table, in which a plurality of interconnected radio ranges may be set up and a particular range station may be located adjacent the point representing the desired landing destination. The radio ranges thus provide a means to follow a course directly to the desired destination, but not necessarily in a proper direction with respect to the simulated landing field to make a proper simulated blind landing. Two separate antennas are provided, each radiating signals at a different frequency, which cooperate with a radio compass loop carried by the recorder to indicate the bearing of two spaced aligned points on a line with the landing runway. Since the range station is not necessarily placed on the airport, the radio compass stations serve as a means to locate the airport while the simulated flight toward the range station is continued. After passing over the range station the inner radio compass transmitter can be tuned in by the compass receiver and used as a homing device, and the table is provided with a switch device engaged by the recorder, which flashes a marker beacon signal in the trainer cockpit. The student then tunes the compass receiver on the second or outer radio compass station and, after making a simulated turn, simulates flight toward the second or outer compass station; and by means of the gyro compass with which the trainers are equipped, he is enabled to make a turn to align the trainer with the simulated airport runway. The radio compass stations, being spaced at definite distances from the runway axis on the record table, in cooperation with the marker beacons, enable a simulated landing to be made by descending at a constant rate of descent from a predetermined simulated altitude above the inner marker beacon and radio compass station. The gyro compass is used to maintain a fixed course after passing over a second or inner marker beacon formed by a switch and signal lamp in the manner above described.

A definite flight procedure is employed in the "U. S. Army Air Corps Blind Landing System," and for more complete details as to the methods of orientation and navigation to make such a blind landing, reference may be had to U. S. Air Commerce Bulletin, vol. 6, entitled "Army Air Corps Radio Blind Landing System, Adopted as Standard."

In order to simulate blind landings under the "Bureau of Standards Blind Landing System," a radio range station is located in the vicinity of the simulated landing field and an additional range station may be located at the point assumed to be the landing field, identical to the miniature radio range except that the antennas are phased to give a very narrow On Course signal leg and the power input may be very small to limit the radiation to a small area on the record table. This range station is used as a runway localizer beacon, and marker switches are retained to simulate marker beacons.

A simple means is used to simulate descent of the trainer along a predetermined glide path comprising an electrical indicator circuit having a pair of resistances therein, one of which is varied by the recorder, and the other of which is varied by the altitude-simulating means, which is standard equipment on aviation ground trainers. The resistances are so arranged that when varied simultaneously in a predetermined ratio, the indicator will remain horizontal and indicate a simulated descent along a predetermined glide path; and the rate of change of resistance per unit length can be made such that descents on parabolic or hyperbolic glide paths may be simulated.

The glide path indicator may be used in conjunction with the Army Air Corps System employing radio compass homing stations aligned with the simulated landing field runway, since such a combination—though not at present in actual use—has attractive possibilities for future use.

The arrangement of all of the various automatic signalling units on the record table makes possible the arrangement of two record table surfaces placed one above the other or in side-by-side arrangement, and each table surface is equipped with similar radio range beacons, marker beacons, and radio compass homing stations. With such an arrangement of parts, the instructor, being relieved of the manual signalling duties, can operate one of the recorders from the table so that it becomes possible to work out interception problems in cooperation with the recorder operated by the student in the flight trainer. Where it is not desired to utilize the apparatus for interception problem work, a second flight trainer may be used and the two trainers may be operated from the single table.

The principal object of this invention is the provision of a miniature automatic radio range beacon or one or more miniature radio compass homing transmitting stations with associated marker beacons, all cooperating with signal and directional receivers located in the cockpit of an aviation ground trainer, whereby simulated blind landings according to the U. S. Army Air Corps Blind Landing System, or modified forms thereof, may be accomplished.

A further object of the invention is the provision of an automatic miniature radio range beacon serving as a runway localizer beacon, or with aligned radio compass transmitting stations, cooperating with marker beacons and with an automatic simulated glide path device, to transmit directional information to suitable signal receivers located in the cockpit of an aviation ground trainer, whereby a student may control the trainer to simulate a descent and a landing in accordance with the "Bureau of Standards Blind Landing System," or modified forms thereof.

Another object of the invention is the provision in an aviation ground trainer system of a miniature radio compass homing transmitter station cooperating with a novel radio compass signal-pickup device, carried by the trainer course recorder, to transmit signals to a radio compass receiver and radio compass indicator located in the cockpit of the aviation ground trainer, whereby a simulated homing flight to the radio compass station may be accomplished.

Another object of the invention is the provision of an aviation ground trainer record table having a miniature radio compass transmitting antenna secured to the table so that a desired point on the table serves as a simulated homing station, a loop antenna pick up carried by the course recorder and connected to a radio compass receiver which operates a radio compass indicator, the said receiver and radio compass indicator being located in the cockpit of the aviation ground trainer.

Another object of the invention is the provision of an aviation ground trainer course recorder having a radio compass loop aerial mounted thereon and rotatable in azimuth with the recorder rollers under control of the aviation ground trainer.

Another object of the invention is the provision in an aviation ground trainer of a record table, a means cooperating with the recorder for simulating a glide path terminating in a point on the record table surface, and means controlled by the simulated altitude condition of said trainer and by the position of the recorder for controlling a glide path indicator mounted on the trainer instrument board.

Another object of the invention is the provision of a plurality of record surfaces on an aviation ground trainer recorder table, each of said surfaces being adapted for use with a course recorder and an automatic signalling system, whereby course interception problems may be solved by the simultaneous operation of two or more recorders, simulating predetermined aircraft flights.

Another object of the invention is the provision in a ground trainer recorder table of one or more switch means, caused to be closed by the course recorder in the movement of said recorder over the record table, to give simulated marker beacon flashes in indicating means mounted within the flight trainer cockpit.

A further object of the invention is the provision of a novel combination of a radio compass receiving antenna and a radio range beacon pickup antenna, the radio compass antenna being mounted to revolve about the axis of the radio range beacon pickup antenna under control of the aviation ground trainer and the radio range beacon antenna serving as a recorder marker device.

Other objects will become apparent to those skilled in the art by reference to the specification and the accompanying drawings, in which.

Figures 1, 2:
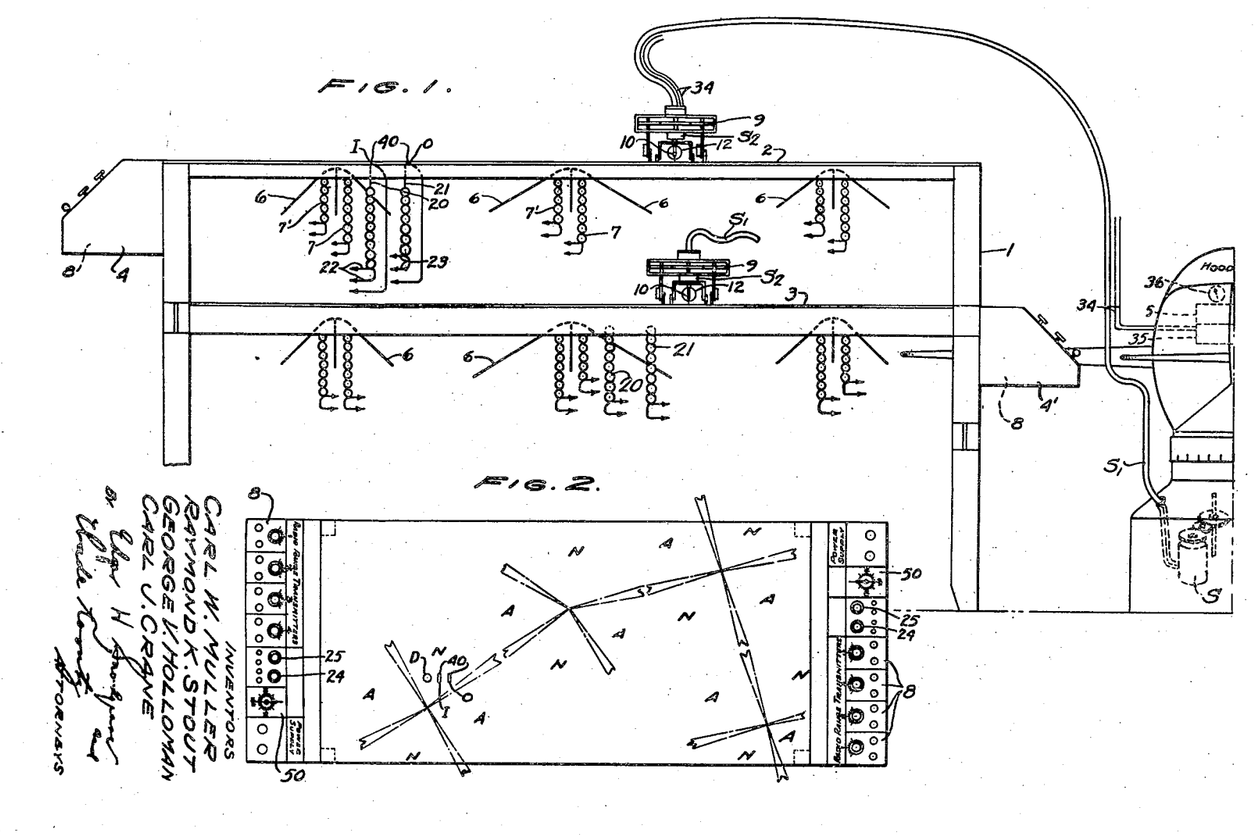
Fig. 1 is a side elevation of a ground trainer record table, showing the mounting of the radio range beacon antennas, the marker beacon switches, the radio compass homing station antennas, and the transmitter control cabinets mounted on the table. The arrangement of the table to employ two record surfaces, permitting simultaneous operation of two course recorders to solve interception problems.
Fig. 2 is a plan view of the table of Fig. 1, showing the radio range courses.

As seen in Fig. 1, there is provided a record table 1 having thereon two record table surfaces 2 and 3 placed one above the other. A control cabinet 4 containing the necessary transmitters, etc., is mounted on the left end of the table 1; and the control cabinet 4 cooperates with the various radio antennas for sending out signals with reference to the table surface 2, while a similar control cabinet 4¹ is used in conjunction with the table surface 3. On the underside of each table there are mounted a plurality of miniature radio range antenna arrays 6, having separate antenna leads 7 and 7¹, respectively, connected to be separately energized by a radio range transmitter 8 of very low power, contained in the respective control cabinets 4 and 5. The construction of such a transmitter and antenna array is fully disclosed in our aforementioned copending application Serial No. 320,878.

The radio range antenna arrays 6, when energized, set up a plurality of interconnected miniature radio range beacons over the surfaces 2 and 3 in the manner shown in Fig. 2, the continuous signal zones being shown. The radio range beacon antennas may be arranged to simulate any desired part of the present radio ranges used on the airways.

Each of the surfaces 2 and 3 serves as a support for a course recorder 9, which is propelled over the table surface at a speed proportional to the simulated air speed of the flight trainer and the recorders being directionally controlled by the trainer in a manner heretofore described. Each recorder carries a pickup antenna 10, which is connected to a radio receiver 5 mounted in the trainer cockpit, and serves to transmit the proper radio ragne A, N, or On Course signal, depending on the location of the recorder on its respective table surface. By the signals the student may simulate flight between any points on the radio range.

To simulate the making of an instrument landing by means of the comparatively simple Army Air Corps Blind Landing System, each table surface has provided on the underside thereof, a pair of vertical non-directional radio compass homing station antennas 20 and 21, respectively. The antennas 20 and 21 are spaced at different distances along a straight radial line from a point D on the table surfaces, representing an airport at the destination (Fig. 2). The antennas 20 and 21 are respectively connected by means of non-inductive pairs of conductors 22 and 23 to separate radio transmitters 24 and 25, shown in Fig. 2. The transmitters energize their respective antennas to transmit a non-directional radio frequency carrier wave, modulated by an audio frequency oscillator, permitting an aural note to be heard in the radio compass receiver and also permitting a visual radio compass indicator to be used. The transmitters 24 and 25 are adjusted for different frequencies, permitting them to be separately identified by tuning the receiver.

A small loop antenna 12 is carried by each recorder and is rotatable about the recorder marker axis in conjunction with the change in the plane of rotation of the feed rollers and marker wheel, where the latter is used. The plane of the loop 12 is such that when the recorder is headed directly toward a radio compass station point, the loop will be perpendicular to the heading axis of the recorder. The radio compass loop is electrically connected by means of conductors 34 to a radio compass receiver 35 placed in the cockpit of the trainer, which can be used with a visual type radio compass indicator 36. The receiver may also be used in conjunction with a loud speaker or with headphones to home with the radio compass loop by the well-known null signal method—i. e., when the plane of the loop is perpendicular to the trainer's longitudinal axis and the recorder is heading directly toward the homing transmitter station no signal will be heard, while if the simulated flight is off a course directly toward the homing station a signal will be heard. The visual indicator is of the zero center type and reads zero when the heading is directly toward the homing station and indicates departures from such a course, either to the right or left thereof. The construction of the radio compass receiver and visual indicator forms no part of the present invention, since commercially available receivers and indicators may be used or apparatus of a simpler nature devised to function in a similar manner.

Figure 3:
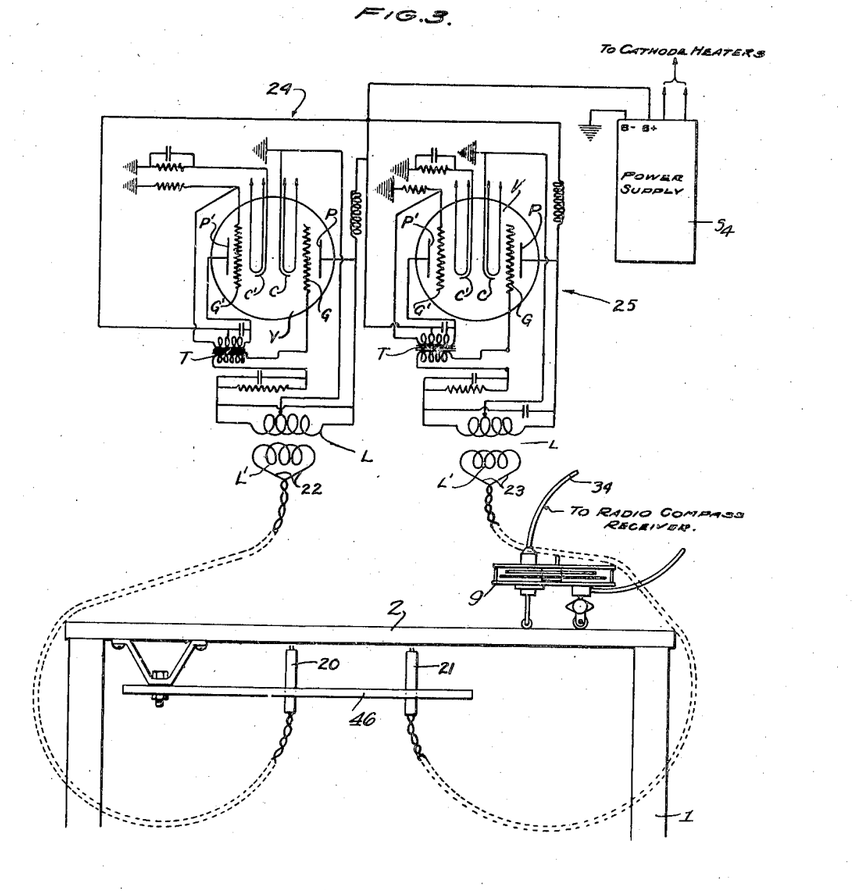
Fig. 3 is a view showing the general radio compass transmitter assembly.

The transmitters for the radio compass homing stations are illustrated in Fig. 3, in which the transmitter 24 comprises a twin triode alternating current type cathode heater, vacuum tube V, having its cathode heater connected to a suitable alternating current voltage supply, forming a part of the power supply S₄.

The cathodes are all connected to the negative high voltage direct current terminal B— of the power supply S₄, the cathode C, grid G, and plate P of the tube V are arranged with the tapped tank inductance L and suitable condensers to form a radio frequency oscillator of the well-known Hartley type. The cathode C¹, grid G¹, and plate P¹ of the tube V are arranged with the tapped primary winding of the audio transformer T and a suitable condenser to form an audio frequency oscillator. The secondary winding of the transformer T is placed in the grid circuit of the radio frequency oscillator and thus modulates the radio frequency oscillation in the tank coil L, which is inductively coupled to an antenna inductance L₁, connected to the antenna leads 22, which in turn energize antenna 20, as above noted.

The transmitter 25 is identical in all respects with the transmitter 24, except that it is tuned for a different audio and radio frequency so that similar parts are identified by the same reference numerals as used with reference to the transmitter 24, the leads 23 feeding the antenna 21. The transmitter units 24 and 25 are entirely conventional in construction, and other oscillator circuits may be equally well employed.

It will thus be seen that when the radio compass receiver 35 is tuned to the frequency of transmitter 24, the radio compass loop 12 on the recorder 9 will pick up the signal transmitted by the antenna 20 and serve to indicate the directional position of the transmitter with respect to the recorder in conjunction with the radio compass indicator 36, and thus locate the desired landing field with respect to the instant course; and by turning the trainer the bearing of the radio compass station may be obtained and the radio range course signals permit return to the original course. The modulated signal permits the compass receiver to be used as an aural homing device using the null signal method of homing to the compass station. While the transmitters are as shown of very low power, so as to confine the energy radiated thereby to a small area of the record table adjacent the station D, by increasing the power input to the radio compass antennas the radio compass may be used as a homing device from any location of the recorder on the table surface.

Figures 4, 5, 6, 7:
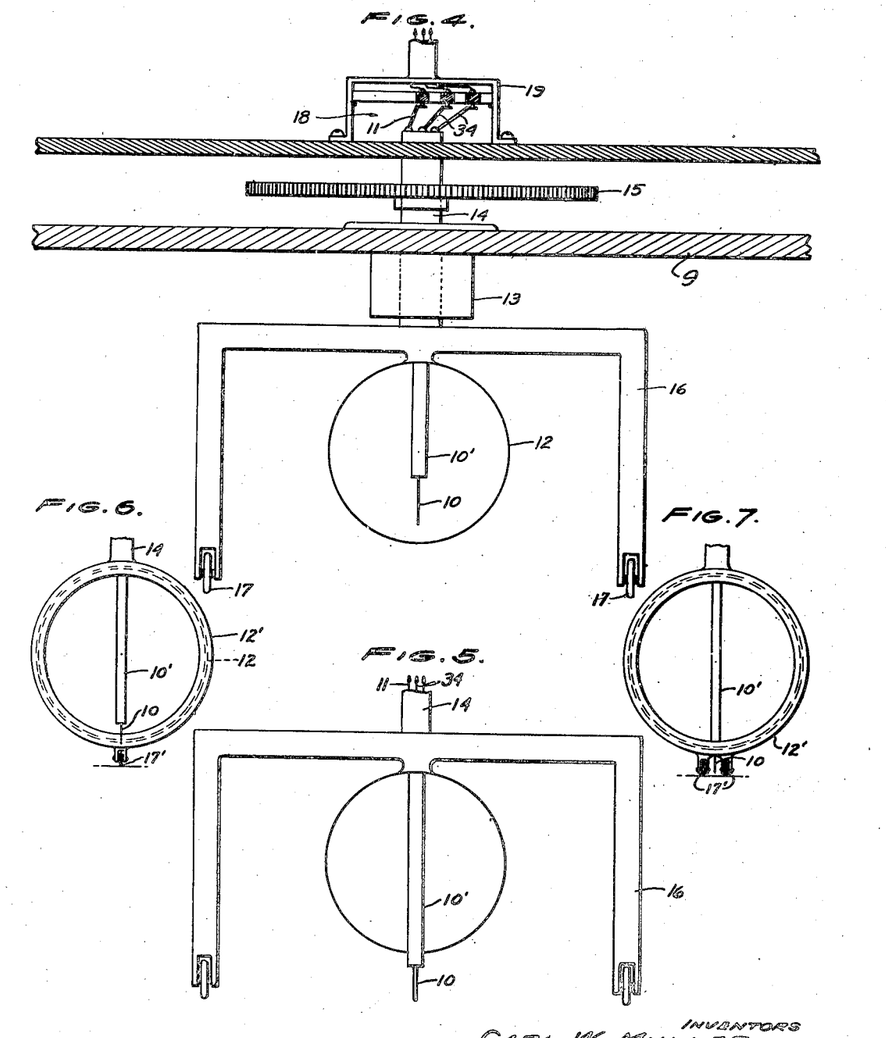
Fig. 4 illustrates a detail view of a form of radio compass pickup loop and its mounting on the course recorder.
Fig. 5 illustrates a modified form of the device of Fig. 4.
Fig. 6 illustrates a further modification of the device of Fig. 4, in which a radio range pickup antenna serves also as a marker device.
Fig. 7 is a further modification of the device of Fig. 4, in which the radio compass loop serves as a support for the recorder marker wheel.

Fig. 4 illustrates one form of radio compass loop antenna pickup and radio range antenna pickup mounted on the recorder. The recorder 9 has a frame, only a portion of which is shown, having an enlarged boss 13 which serves as a bearing for the conventional marker wheel shaft. The marker wheel shaft is replaced by a hollow shaft 14 having a fibre fork 16 secured to the lower end thereof, and each leg of the fork carries a pivotally mounted roller 17. The conventional marker wheel steering gear 15 is secured adjacent the upper end of the shaft 14. A loop antenna 12, comprising one or more turns of wire, is secured to the fibre fork 16 and is rotatable therewith. The loop is symmetrical with respect to the axis of the hollow shaft 14 and the miniature radio range antenna 10, having a shield 10¹ is arranged coaxial with the hollow shaft 14, the antenna 10 being close to the surface of the record sheet on the table 1. The terminals of the loop antenna 12 and the miniature radio range antenna pickup 10 pass through the hollow shaft 14 and are connected to the spring contacts of a rotary wiper contact device 18 supported by a bracket 19 from the recorder frame. The radio compass antenna leads 34 and the miniature radio range antenna lead 11 are connected to the contact device 18 and are contained in a suitably shielded flexible cable and connect respectively to the radio compass receiver 35 and the miniature radio range receiver 5.

Fig. 5 illustrates a further modification of the radio compass loop and miniature radio range antenna mounting shown in Fig. 4 and is identical with the modification shown in Fig. 4, except that the miniature radio range antenna 10 and its shield 10¹ are extended so that the antenna 10 contacts the record sheet, and thus may serve as a marker or tracer point.

A further modification of the radio compass loop and miniature radio range antenna mounting is shown in Fig. 6, in which the shaft 14 carries a hollow shield 12¹ for the compass loop 12, and the lower end of the miniature radio range antenna is placed closely adjacent the fibre marker wheel 17¹, rotatably supported by the shield 12¹.

Fig. 7 illustrates a modified form of the radio compass loop and radio range pickup antenna mounting shown in Fig. 4 and differs therefrom in that the shield 12¹ is provided with a pair of marker wheels 17¹, spaced a slight distance apart, so that the pickup antenna 10 may terminate very close to the record sheet surface.

The above-described antenna mounting means permits the radio compass loop to be rotated by the recorder wheel steering mechanism, which is in turn controlled by the ground trainer, and also permits the miniature radio range pickup antenna to serve as a marker or to be placed directly over the marker wheel, so that location on the map surface coincides with the marker wheel trace at any instant.

Figures 8, 9, 10, 11:
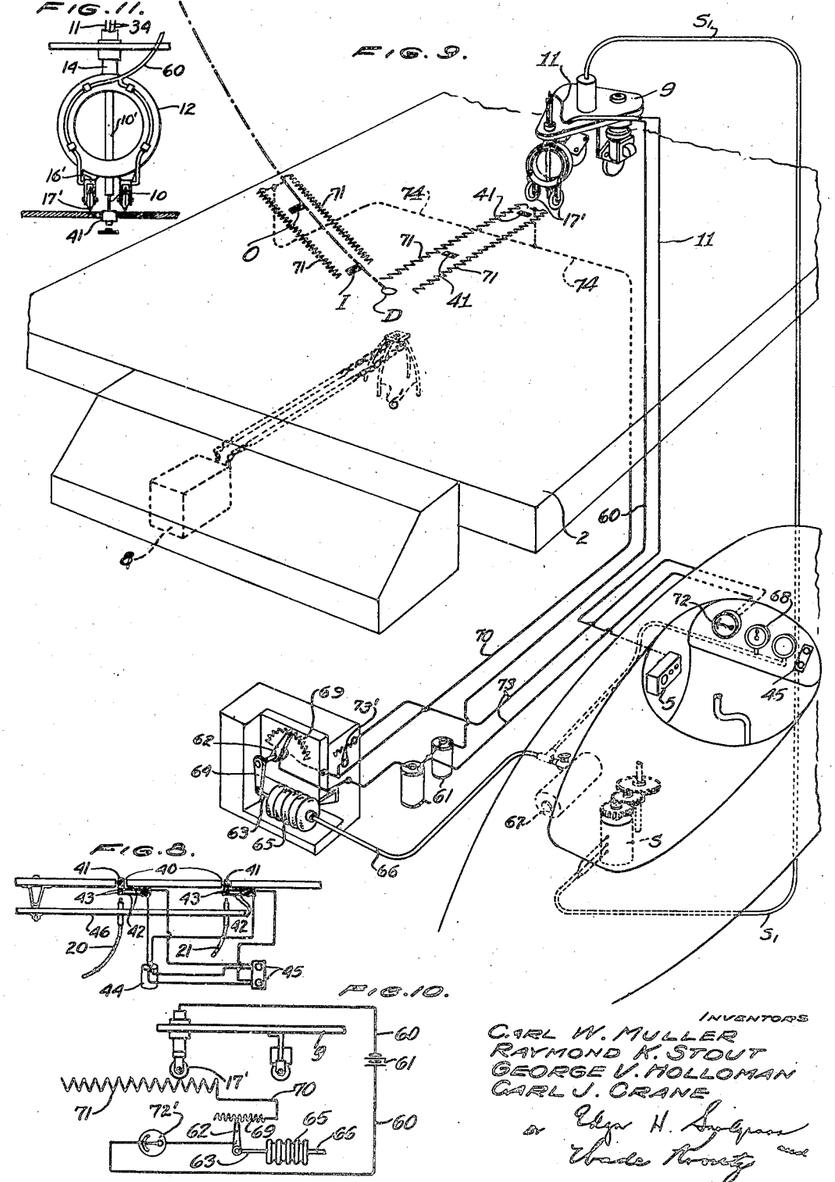
Fig. 8 is a detail view of the marker beacon switches and the manner in which they are operated by the trainer course recorder.
Fig. 9 is an isometric view of the table of Fig. 1, arranged for simulating a radio glide path beam, including an indicator operated by the altitude simulating means and by the trainer course recorder, in combination with a miniature localizer beam transmitter, enabling simulated landings in accordance with the "Bureau of Standards Blind Landing System" to be accomplished.
Fig. 10 illustrates a modified form of circuit for use with the glide path indicator illustrated in Fig. 9.
Fig. 11 illustrates a contact roller and antenna structure for use with the glide path indicator shown in Fig. 9.

As indicated in Figs. 1 and 2 and shown in detail in Fig. 8, the means to simulate landing approach marker beacons comprise a series of slots 40 cut in the record table, the slots having small fibre blocks 41 placed therein and secured to the flexible contact blades 42, which may engage the contacts 43 to form a means to complete a circuit from a battery 44 through a marker signal lamp 45 mounted on the trainer instrument board. The marker beacon switch slots 40 are spaced apart along the axis of the simulated runways of the landing field D (Fig. 2) at the same distance from the point D as the radio compass homing antennas 20 and 21, which are mounted on an insulated adjustable pivotally mounted arm 46 so as to be moved into the line of the runway which is to be simulated extending from point D. The marker beacon switches will thus be directly over the radio compass antennas. The marker beacon switches are closed by the marker or marker wheel of the recorder as it passes over the fibre blocks 41. Since two aligned marker beacons are used for each landing approach and the pair of marker beacon switches to be used coincide with the location of the radio compass homing transmitters, the marker beacon at the point most distant from the assumed landing field D is referred to as the outer marker beacon or the outer radio compass homing station and is indicated by the reference character O in Figs. 1 and 2, and the inner marker beacon switch and radio compass homing station are similarly indicated by the reference character I. All of the inner marker beacon switches are connected in parallel to operate one signal lamp, or other indicator, 45, mounted in the trainer, and all of the outer marker beacon switches are similarly connected in parallel to operate a second marker beacon signal lamp, or indicator, 45, similarly mounted in the trainer; and the signals may be differentiated by using different colored lamps or by indicia placed alongside each lamp.

The structure so far described is sufficient to make a simulated landing with the ground trainer in accordance with the Army Air Corps Blind Flying System, as previously described, and can be made as follows with respect to a single trainer and record table surface. The trainer is placed in operation with the recorder 9 placed on the table at a desired starting point with the initial heading of the recorder and trainer adjusted to be the same with respect to the record map directions. The recorder is placed in operation by energizing its propelling motors, by closing a switch at the instructor's control cabinet. The recorder 9 will then travel over the record map at a speed proportional to the simulated ground speed of the trainer, and the recorder will trace upon the record map the simulated flight path of the trainer. The radio range transmitters 8 and radio compass transmitters 24 and 25 being energized, the student tunes the range receiver 5 to the frequency of the nearest range antenna 6 and, by means of the A, N, and On Course signals, simulates flight to that particular point and then proceeds from one range station to the next in the same manner as if flying on an actual airway radio range beacon system. When the range station adjacent the landing point D is being approached, the radio compass receiver 35 is tuned to either the inner or outer radio compass homing stations, at O or I, and the radio compass will indicate whether the station is to the right or left of the radio range course; and the bearing of the radio compass station can be obtained in the manner above described if so desired. After simulated arrival at the radio range station nearest point D, the inner radio compass station at I is tuned in on the radio compass receiver 35 and the trainer heading changed until the recorder loop aerial 12 is perpendicular to the heading directly toward the station at I, when the visual radio compass indicator will be centered and, if aural signals are used, no signal will be heard. When the marker wheel of the recorder passes over the fibre switch actuator 41 at the inner station I, one of the marker beacon indicators 46 in the trainer cockpit will flash and the means for simulating the gyro compass can be set. The second or outer radio compass station O is then tuned in on the compass receiver 35 and the trainer turned to home toward point O; and when the recorder marker wheel passes over the fibre switch actuator at O, the other marker beacon indicator in the trainer cockpit will flash and the simulated flight is continued outward for a given time and a turn is then simulated in accordance with standard practice and the recorder should then be aligned with the assumed runway and the radio compass enables homing directly toward the outer station at a simulated altitude of—say 800 feet, and when the outer marker beacon signal flashes, the radio compass is tuned to home on the inner station, and the gyro compass is then set and the simulated descent is then made at a constant rate of descent, so that the simulated altitude of the trainer is—say 150 feet, and when the recorder passes over the marker beacon switch at I, the simulated descent is then made at a constant rate—for example, 400 feet per minute—and the course is kept by the directional gyro. When the altimeter reads zero, the landing at D is assumed to have been completed.

With the novel trainer table assembly as shown, two trainers may be operated simultaneously, and where it is desired to work out interception problems, one of the recorders 9—for example, the one used on the lower table surface 3—may have its Selsyn steering motor disconnected from a flight trainer Selsyn transmitter and connected by a plug to the "selsyn" transmitter 50, manually controlled by the instructor. The recorder 9, moving on the upper record table surface 2, controlled by the trainer, being operated by the student, may simulate a flight to a certain interception point, while the recorder operated by the instructor proceeds along a different course to the same interception point on the lower record table surface 3, and the correctness of solution of the interception problem can then be determined by examination of the record maps or by aural information from the instructor to the student, where, for example, the point of interception is assumed to be at a given radio range station.

In order to simulate blind landings in accordance with the Bureau of Standards Blind Landing System, it is essential to have a means to simulate a glide path beacon and, in Fig. 9, a simple means for accomplishing such a result is schematically illustrated. The recorder 9 has its frame and supporting rollers 17¹ connected by a conductor 60 to one terminal of a battery 61, the other terminal of which is connected to the slidable resistor contact 62, which is rotatable by means of a rod 63 connected to the arm 64. The rod 63 is connected to a pressure responsive device 65. The pressure responsive device 65 is connected by a conduit 66 to the vacuum tank 67 of the aviation ground trainer. An altimeter 68 is also connected to the vacuum tank 67. The vacuum tank is connected to a pump (not shown) which is controlled by alteration in the vertical plane of the trainer attitude and by a throttle in the trainer, so that the trainer, when kept in the climbing attitude with the throttle open, causes the pump to lower the pressure in the vacuum tank below atmospheric pressure and thus causes the altimeter to read a simulated altitude of the trainer, and a rate of climb indicator connected to the tank indicates rate of climb or descent. When the trainer is placed in a descending attitude, the tank is vented through a resistance (not shown), which causes the altimeter to move in the descending direction and the rate of climb indicator to indicate the rate of descent. The above-described means for simulating altitude in an aviation ground trainer is well known and illustrated in the aforementioned U. S. Patent 2,099,857 to Edwin A. Link, Jr., and hence is not illustrated in the drawings. It is seen, however, that the pressure responsive device 65 moves the variable resistance contact 62 an amount proportional to the instant simulated altitude of the trainer within the limits of travel permitted.

The variable resistance contact 62 engages a resistance 69, connected in series by a conductor 70, with the resistances 71, which are imbedded in the surface 2 of the record table 1. A zero center galvanometer 72 is connected in shunt from the mid-point of the battery to the conductor 70 by conductors 73, and the galvanometer has an adjustable resistance 73¹ connected in series therewith. The resistances 71 are adapted to be contacted by the supporting rollers 17¹ of the recorder 9 and thus completes the circuit. The zero center galvanometer 72 is mounted on the instrument panel of the trainer so that the pointer is horizontal and the movement of the pointer is such that an unbalance of the resistances in the branch circuits in one sense will cause the indicator pointer to move down, while an unbalance in the resistances in the opposite sense will cause the indicator to move up. In operation the movement of the pressure responsive device 65 is limited, so that above a predetermined altitude the minimum resistance of the resistance 69 is in series with the battery and, as long as the resistance in each branch on opposite sides of the galvanometer remains equal, the pointer will remain on the zero indicia. The recorder, in engaging the resistance 71, simulates entering the glide path beam and, as the simulated descent is made, the resistance contact 62 will move clockwise, as seen in Fig. 9, increasing the value of the resistance 69, while the amount of the resistance 71 inserted in the battery circuit is increased as the recorder and supporting rollers 17¹ move to the left. If the rate of increase of the resistance 69 equals the rate of increase of resistance 71, the resistances in the branch circuits remain equal and the indicator will continue to read zero. If the rate of descent and the equivalent rate of change of resistance of resistor 69 should increase, the unbalance of the resistances in the branch circuits will cause the indicator pointer to move down, indicating that the simulated position of the trainer is below the proper glide path.

If the simulated rate of descent is less than the proper value, the unbalance of the resistances in the branch circuits will cause the indicator pointer to move upward and indicate that the simulated position of the trainer is above the proper glide path.

By proper manipulation of the trainer controls the student may keep the pointer of the indicator 72 in the horizontal position and simulate an instrument landing on a radio glide path beacon.

In order to simulate a curved glide path landing beam, the value of the resistance per unit length of the resistances 69 and 71 may be so designed that the student will have to continually change the trainer attitude in order to change the simulated rate of descent, to keep on a curved glide path similar to the curved radio landing beam actually used in the Bureau of Standards Blind Landing System. The ratio of the resistance per unit length of the resistances 69 and 71 must be designed for the actual permissible simulated rates of descent and simulated air speed of the trainer.

Fig. 9 also illustrates the glide path device used in conjuction with the trainer table to simulate blind landings at the airport D in accordance with the Bureau of Standards System. At the point D on the under surface 2 of the record table 1 a miniature radio range antenna $6^1$ is adjustably rotatably mounted and is connected to a radio range transmitter 8 in the same manner as the range transmitters 8 in the device of Fig. 1. The antenna patterns are so arranged by altering the resistance in one of the antennas, that the equal "On Course" signal zone occurs on only two diametrically disposed legs, and one of the legs is so arranged by rotation of the antenna array that is coincides with the axis of the runway being simulated. This range antenna then serves to propagate a miniature landing runway localizer beam serving to guide the trainer in the runway path. The power radiated by the antenna array $6^1$ may be very small, thus localizing the beam, and by proper phasing of the antenna elements, the "On Course" signal zone may be made very narrow. The resistance 71 is formed by two branches symmetrically arranged with respect to the various simulated runways, and all of the separate runway resistances are connected in parallel by a conductor 74, which is connected to the conductor 70; and only the resistance 71 which is aligned with the simulated runway to be used will be effective in conjunction with the indicator 72 and the recorder 9. Between the branches of each resistance 71 and at desired radial distances from point D, marker beacon switches 41 are installed to simulate outer and inner marker beacons exactly in the same manner as illustrated in Figs. 1 and 8 and described above, and these switches are connected to the marker beacon signal lamps in the manner above described.

Fig. 10 illustrates a modified form of indicator circuit for use with the device illustrated in Fig. 9 and consists in using an ammeter $72^1$ placed in the battery circuit in place of a voltmeter, the operation being identical to that of the device illustrated in Fig. 9, except that the resistances are varied inversely with respect to each other, so that as long as the resistance in series with the battery remains constant, the indicator pointer will remain in a horizontal position determined by the initial resistance placed in series with the batteries which can, of course, be adjusted as desired.

Fig. 11 illustrates in detail the wheel contact used to cooperate with the resistance 71. The device is similar in most respects to the device of Fig. 4, and similar parts are given the same reference numerals as in Fig. 4. The hollow wheel steering shaft 14 has a shielded loop aerial 12 secured to the lower end thereof, and small metal forks $16^1$ are supported by the loop aerial shield but insulated therefrom. Each small fork $16^1$ carries a metal roller $17^1$, and the metal forks $16^1$ are electrically connected in parallel to a single contact of the rotary switch 18. The metal rollers $17^1$ are spaced apart an amount equal to the spacing of the branches of the resistance 71, and the radio range receiver antenna pickup 10, with its shield $10^1$, is centrally located between the rollers $17^1$, as in the device of Fig. 4, and the end of the antenna is placed very close to the table surface 2 and may contact the fibre blocks 41 of the marker beacon switches, to successively operate the switches, to actuate the marker beacon signal lamps 45, placed on the trainer instrument board. The antenna 10 is connected to the lead 11, which connects to the radio range signal receiver in the trainer cockpit and now serves to receive the localizer beam signals. As disclosed in our previously-mentioned co-pending application, the output of the miniature radio range transmitters is modulated at an audio frequency, so that the modulated output of the localizer beam transmitter may be used to operate a known type of runway localizer beam visual course indicator developed by the U. S. Bureau of Standards, and such an indicator may be used in conjunction with the landing beam indicator to maintain the trainer on the simulated glide path and directionally aligned with the runway axis. Where the expense of such a course indicator is prohibitive, the conventional A, N, and On Course, or other combination of signals, may be used with the headset in conjunction with the radio range receiver.

To carry out the Bureau of Standards Blind Landing System with the devices illustrated in Fig. 9, the radio range station nearest the point D is passed over in the simulated flight, and the student then makes a turn and picks up the localizer beam and orientates the trainer to get on the simulated beam in the proper direction and, by the visual indicator if used or by aural signals, proceeds to simulate flight towards point D. When the recorder wheel $17^1$ strike the resistance 71, the student will know that the landing beam is intercepted, and the student then causes the trainer to simulate flight on a radio landing beam. When the recorder 9 passes over the outer marker beacon at O, the antenna pickup 11 will close the marker beacon switch at 42—43 and cause one of the signal lamps 45 to flash. The second marker beacon signal will then be operated, and shortly thereafter, if the landing guide beam is correctly followed and the simulated engine throttle properly controlled, the altimeter should read zero, and, where desired, a signal lamp may be connected to be operated by the altimeter pointer to be flashed when the pointer reaches its zero position to simulate a landing.

The record table surface for use with the Bureau of Standards Blind Landing System may be made as a permanent assembly and made removable so that it may be put in place when such instruction is desired. In order to make the resistances 71 of sufficient length, the simulated map scale must be enlarged and the recorder speed accordingly adjusted. The wheel assembly shown is not well adapted to trace a permanent record in the vicinity of the resistances 71 so that the recorder tracing function is preferably not used in conjunction with this blind landing system since the indication of the glide path indicator furnishes all of the necessary information as to the assumed position of the trainer with respect to the predetermined assumed glide path, though a record map sheet cut out for the switch blocks 41 and resistances 71 could be used with the radio range antenna 10, serving as a marker device for tracing the assumed ground track of the trainer, alongside of which the simulated altitudes at various points may be marked to enable a plot of the assumed descent to be made, as hereinafter more fully described.

Figure 12:
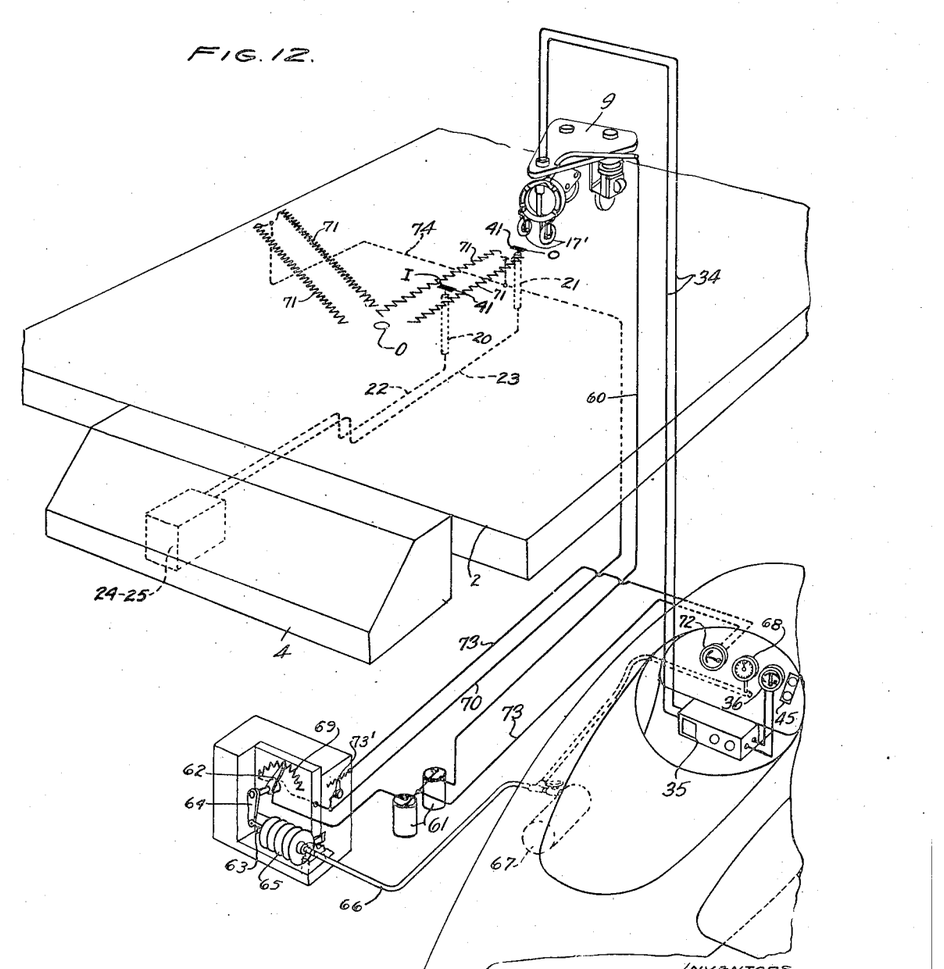
Fig. 12 illustrates an isometric view of the structure of Fig. 9, modified by replacing the radio localizer beam transmitter with the aligned radio compass homing transmitters, as used in the device illustrated in Figs. 1 and 2.

Fig. 12 illustrates a modification of the device illustrated in Fig. 9, in which the localizer beam transmitter 80 and the antenna array 61 is replaced by the radio compass homing transmitters 24 and 25 and transmitting antennas 20 and 21. The radio compass loop antenna 12, compass receiver 35, and compass indicator 36 are used to align the trainer with the simulated landing runway. The glide path simulating means is similar in all respects to that form illustrated in Fig. 9.

A simulated blind landing is made by aligning the trainer with the simulated runway path by the same procedure as above described with reference to Fig. 1, where the landing in accordance with the Army Air Corps System was described and the simulated descent is made employing the glide path indicator instead of descending at a constant rate of descent from predetermined simulated altitudes at the marker beacon stations O and I. The marker beacon system is identical to that used in modifications, Figs. 1 and 9, and illustrated in detail in Fig. 8.

In the above-described devices for simulating blind landings in an aviation ground trainer, the speed of the recorder is considerably increased over the speed normally employed in the solution of orientation problems, and the map scale is accordingly made to correspond to the recorder speed used. The recorder, in tracing the course traversed in a simulated landing, is eventually aligned with the landing runway and proceeds along the runway axis with the trainer in the descending attitude. During the descent, the student in the trainer calls the altitude readings over the interphone systems in units of one hundred feet, and the instructor may mark the altitude readings on the chart opposite the corresponding position of the recorder marker wheel. When the altimeter reads zero, the student gives a signal, or an altimeter-controlled signal may be used, signifying that the simulated landing is completed; and the position of the marker wheel relative to the landing runway area printed on the record chart is marked by the instructor. By means of the altitude readings at the marked positions on the ground track of the descent, the glide path and rate of descent may be determined by plotting; and comparisons with the theoretical ideal glide path may be determined. The terminal point of the simulated landing furnishes all of the necessary evidence of whether or not the simulated landing was successful; i. e., whether the point of landing falls within predetermined limits on the landing runway. The checking of altitudes in the glide is purely optional when using the Bureau of Standards or other glide path system, while such readings are very desirable with reference to the Army Air Corps System, where the correct rate of descent in the glide is a critical element. Instead of the student's being required to call the altitude readings over the interphone communication system, the instructor may be provided with a remote indicating altimeter, and thus may note the altimeter readings at predetermined positions of the course indicator and mark the readings on the chart.

While only modifications illustrative of the invention have been shown, many modifications of the invention will become apparent to those skilled in the art, falling within the scope of the invention as defined by the appended claims.

We claim:

1. In combination, an aviation ground trainer, a reference surface, a course recorder adapted to move relative to said reference surface at a speed proportional to the assumed flight speed of said trainer and directionally controlled by said trainer during said relative movement, means to establish a miniature radio range radiant energy signal field relative to a first point on said reference surface, a radio range signal pickup antenna carried by said recorder and movable therewith, a signal receiver mounted in said trainer and connected to said radio range signal pickup antenna, a means for establishing a non-directional radiant energy signal field relative to a second point on said reference surface having a predetermined relation to said first point, a radio compass loop antenna carried by said recorder and movable therewith, a radio compass receiver connected to said radio compass loop antenna, and a radio compass indicator connected to said radio compass receiver and mounted in said trainer, said signal receiver and said radio compass indicator being operable to indicate the relative bearings of said points with reference to the instant position of said recorder on said reference surface.

2. In aviation ground training apparatus, a reference surface, a course recorder movable over said surface at a speed proportional to the assumed velocity of flight of an aviation ground trainer and adapted to be directionally controlled by said trainer during said relative movement, means to establish a miniature radio range signal field relative to a first point on said reference surface, a radio range signal pickup antenna carried by said recorder and movable therewith, a radio range signal receiver connected to said radio range signal pickup antenna, a means for establishing a non-directional radiant enegy signal field relative to a second point on said reference surface having a predetermined relation to said first point, a radio compass loop antenna carried by said recorder and movable therewith, a radio compass receiver connected to said radio compass loop antenna, and a radio compass indicator connected to said radio compass receiver, said radio range signal receiver and said radio compass indicator being operable to indicate the relative bearings of said points on said reference surface with respect to the instant position of said recorder on said reference surface.

3. In a means for simulating instrument-directed flight of an aircraft, an aviation ground trainer for simulating said aircraft flight, a reference surface, a course recorder movable relative to said reference surface at a speed proportional to the simulated flight velocity of said aircraft and directionally controlled by said trainer, a means for establishing a non-directional radiant energy signal field relative to a point on said reference surface, a radio compass loop antenna carried by said recorder and movable therewith, a radio compass signal receiver connected to said loop antenna, and a radio compass indicator connected to said signal receiver and operative to indicate departure of said recorder from a course directly toward said point on said reference table.

4. The structure as claimed in claim 3, wherein the radio compass loop antenna is rotatable and directionally controlled by said recorder so that directional change of said recorder produces an equivalent angular rotation of said radio compass loop.

5. In a radio compass homing system for use in aviation ground trainers, a ground trainer, a reference surface, a course recorder movable relative to said reference surface at a speed proportional to the assumed flight velocity of said trainer, a radio compass signal receiving loop antenna rotatably mounted on said recorder, and means controlled by said trainer for simultaneously directionally controlling said relative motion of said course recorder and the plane of said radio compass loop antenna.

6. In an aviation ground training system, a record map table, an aviation ground trainer, a course recorder driven relative to said record map table at a velocity proportional to the assumed velocity in flight of said trainer and directionally controlled by said trainer, means for establishing a directional radiant energy signalling field relative to a point on said record map table, means for establishing a non-directional radiant energy signalling field relative to a point on said record map table, and separate signal pickup means carried by said course recorder, each of said signal pickup means cooperating with one of said radiant energy signalling fields.

7. In an aviation ground training system, a ground trainer rotatable about a vertical axis for simulating aircraft flight, a reference surface, a radiant energy transmitter, an antenna connected to said transmitter and mounted so as to radiate signals generated by said transmitter with non-directional characteristics from a point on said reference surface, a radiant energy signal pickup means movable relative to said reference surface at a velocity proportional to the simulated velocity in flight of said aircraft, and means for varying the signal intensity received by said signal pickup means in accordance with the directional change in heading of said trainer.

8. The structure as claimed in claim 7, in which the radiant energy transmitters generate electromagnetic signal radiations.

9. In an aviation ground training system, an aviation ground trainer rotatable about a vertical axis for simulating aircraft flight, a reference surface, an electrical radiant energy transmitter, an antenna connected to said transmitter for propagating electromagnetic signal radiations having non-directional characteristics with respect to a point on said reference surface, a signal pickup antenna placed in the field of said electromagnetic signal radiations, means for moving said signal pickup antenna relative to said reference surface at a velocity proportional to the simulated velocity in flight of said aircraft, and means controlled by said trainer for varying the magnitude of signal reception of said signal pickup antenna in accordance with the directional heading of said trainer with respect to said point on said reference surface.

10. The structure as claimed in claim 9, in which said signal pickup antenna is a loop antenna.

11. The structure as claimed in claim 9, in which the signal pickup antenna is connected to a signal receiving and indicating means, whereby the directional heading of said trainer with respect to said point on said reference surface may be determined.

12. In a course indicator for ground trainers, a reference surface, a frame relatively movable with respect to said reference surface at a velocity proportional to the assumed velocity of an aircraft and directionally controlled in relative motion in a manner equivalent to the directional changes of said aircraft, a first signal pickup antenna mounted on said course indicator frame and responsive to directionally-radiated electromagnetic signals, a second signal pickup antenna formed as a loop antenna mounted on said course indicator frame, and rotatable about the axis of said first signal pickup antenna and responsive to electromagnetic signal radiations of a non-directional character, and means to directionally control the plane of said loop antenna in response to directional changes in the relative movement of said frame.

13. The structure as claimed in claim 12, in which said reference surface is a record sheet for recording the path of said frame relative to said record sheet and in which said first signal pickup antenna serves as a tracer means for causing a record of the path of relative movement between said course indicator and said record sheet to be impressed on said record sheet.

14. The structure as claimed in claim 12, in which said loop antenna is provided with rollers for movably supporting said course indicator on said reference surface.

15. The structure as claimed in claim 12, in which the first and second signal pickup antennas are provided with radio shielding means.

16. A means for simulating instrument landings in a ground training system comprising an aviation ground trainer for simulating the flight of an aircraft, a reference surface, a course indicator movable relative to said reference surface at a velocity proportional to the simulated velocity in flight of said aircraft and directionally controlled by said trainer during said relative movement, means for establishing a plurality of radiant energy signalling fields, each having non-directional radiation characteristics, one of said radiant energy signalling fields being centrally disposed with reference to one point on said reference surface, the other of said radiant energy signalling fields being centrally disposed with reference to a second point on said reference surface and having a signal-generating characteristic different than said first signalling field, said first and second points being aligned and spaced at different radial distances from a third point on said reference surface simulating a landing field, a radiant energy signal pickup device carried by said course indicator, a radiant energy receiver and indicator connected to said radiant energy signal pickup device, means to simulate a marker beacon at each of said first and second points, including an electrical circuit, a switch in said circuit, indicator means mounted in said trainer and connected in said circuit, said switches being mounted adjacent said first and second points on said reference surface, and means carried by said course indicator for successively operating said switches, whereby said radiant energy signal receiver and indicator is operative to indicate the course of said course indicator relative to a linear path connecting said points, and said marker beacon simulating means indicate predetermined positions of said course indicator on said linear path relative to said third point.

17. In an aviation ground training system, an aviation ground trainer rotatable about a vertical axis for simulating the flight of an aircraft, a reference surface, a course indicator movable relative to said reference surface and adapted to be propelled over said reference surface at a velocity proportional to the simulated velocity in flight of said aircraft and directionally controlled by said trainer, a radio signal transmitter, an antenna connected to said transmitter for radiating radio signals omnidirectionally from a point on said reference surface, a radio compass loop antenna carried by said course indicator, a means for directionally controlling the plan of said loop antenna in accordance with the instant heading of said trainer, a marker beacon simulating means including a marker beacon indicator mounted in said trainer, means for operating said marker beacon simulating means by said course indicator to indicate the relative position of said course indicator with respect to said point, and radio signal indicating means connected to said radio compass loop antenna and mounted in said trainer operative to indicate the departure of said course indicator from a heading directly toward or away from said point on said reference surface.

18. In combination, an aviation ground trainer for simulating aircraft flight, a reference surface, a course indicator movable relative to said surface and adapted to move relative to said reference surface in a manner equivalent to the assumed flight of said trainer, at least one radio signal transmitter, a non-directional antenna connected to said transmitter for radiating radio signals substantially omnidirectionally from a point on said reference surface, means for receiving said radio signals, including a directional antenna and indicating means operative to indicate the heading of said trainer relative to the point on said reference surface, and signal means operated by said course indicator for indicating the assumed arrival of said trainer over a point simulated by the said point on said reference surface.

19. In a means to simulate instrument landings in an aviation ground trainer, a reference surface, a course indicator adapted to have a motion relative to said reference surface proportional to the simulated velocity of flight of an aircraft and directionally controlled in accordance with the directional change of said trainer, a plurality of radiant energy signal transmitters, a plurality of radiant energy signal radiators, each connected to one of said transmitters and located so as to radiate radiant energy signal fields symmetrically with respect to predetermined aligned spaced points on said reference surface, a directional radiant energy signal pickup device mounted on said course indicator, a radiant energy signal receiver connected to said signal pickup device and controllable to be responsive to any one of said radiant energy signal fields, and signal indicating means connected to said radiant energy signal receiver, whereby the instant heading of said course indicator relative to a linear path through said points may be determined.

20. A means for simulating a directional path aligned with a simulated airport runway in an aviation ground training system, comprising a record table, a plurality of radio signal transmitters, and a plurality of non-directional antennas, each connected to one of said transmitters, said antennas being arranged adjacent to said reference surface in spaced relation along a radial line terminating at a point on said reference surface, said antenna radiation being adjacent said reference surface.

21. For use in an aviation ground trainer system, a reference surface, a course recorder movable over said reference surface and adapted to move at a speed proportional to the assumed velocity in flight of the ground trainer and directionally controllable to have a directional heading on said surface equivalent to the instant heading of said trainer, a switch-operating means projecting slightly above said reference surface and located at a predetermined point thereon, a normally open switch actuated by said switch-operating means, an electric circuit controlled by said contact switch including an electric power source and a signal indicator, and means forming part of said course recorder for engaging said switch-operating means to close said signal switch and to energize said indicator, whereby the position of said recorder on said reference surface is indicated by said signal indicator.

22. The structure as claimed in claim 21, in which the means forming part of said course recorder for engaging said switch-operating means is a supporting roller for said course recorder.

23. The structure as claimed in claim 21, in which the means forming part of said course recorder for engaging said switch-operating means is a signal-receiving antenna mounted on said course recorder.

24. In a ground training system for simulating instrument landings, an aviation ground trainer for simulating an aircraft in flight, a reference surface, a course recorder movable relative to said reference surface at a velocity proportional to the simulated velocity in flight of said aircraft and directionally controlled by said aircraft during said relative movement, a plurality of radiant energy signal transmitters, each having a different signal-emitting characteristic, a plurality of radiant energy signal radiators, each connected to one of said signal transmitters, said signal radiators being positioned adjacent said reference surface and spaced at predetermined distances from a point on said reference surface in alignment with a simulated landing runway on said reference surface terminating at said point, means for indicating the assumed departure of said trainer from a predetermined assumed glide path in a vertical plane parallel with said simulated landing runway, and means for simulating marker beacons at spaced points along said simulated landing runway, including an electrical circuit, indicator means connected in said circuit and mounted in the cockpit of said trainer, and means actuated by said recorder during relative movement along said simulated landing runway for rendering said electric circuit operative to actuate said last named indicator means.

25. In a ground training system for simulating instrument landings, an aviation ground trainer for simulating an aircraft in flight, a reference surface, a course recorder movable relative to said reference surface at a velocity proportional to the simulated velocity in flight of said aircraft and directionally controlled by said trainer during said relative movement, a plurality of radiant energy signal generators, each having a different signal-emitting characteristic, a plurality of radiant energy signal radiators, each connected to one of said signal generators, said signal radiators being positioned adjacent said reference surface and spaced at predetermined distances from a point on said reference surface in alignment with a simulated landing runway on said reference surface terminating at said point, a directional radiant energy signal pickup mounted on said course indicator, a radiant energy receiver connected to signal pickup, an indicator connected to said receiver and operative to indicate a departure of said recorder from a course aligned with said assumed landing runway, and means for indicating the assumed departure of said trainer from a predetermined assumed glide path in a vertical plane parallel with said simulated runway on said reference surface.

26. The structure as claimed in claim 25, in which the radiant energy signal generators are radio transmitters and in which the radiant energy signal radiators are radio antennas having omnidirectional radiating characteristics.

27. The structure as claimed in claim 25, in which the radiant energy signal generators are radio transmitters and in which the radiant energy signal radiators are radio antennas having omnidirectional radiating characteristics and said radiant energy signal pickup is a loop antenna rotatable and directionally controlled by said trainer in a manner equivalent to the directional control of said course recorder by said trainer.

28. The structure as claimed in claim 25, in which the means for indicating the assumed departure of said trainer from a predetermined assumed glide path comprises an electrical circuit, an indicator connected in said circuit and having a predetermined normal position, a means for simulating altitude actuated by said trainer, means actuated by said altitude simulating means for varying the electrical characteristics of said circuit tending to cause said indicator to move in one direction from said normal position, and means actuated by said recorder for varying the electrical characteristics of said electric circuit tending to cause movement of said indicator in a direction opposite to said one direction from the normal position, the resultant deflection of said indicator representing the simulated departure of said trainer in the vertical plane relative to said assumed glide path.

29. In a ground trainer instrument landing system, a ground trainer for simulating flight of an aircraft, an altitude-simulating means controlled by said trainer, a course recorder movable relative to a record surface at a velocity proportional to the simulated velocity of flight of said aircraft, an indicator for indicating the simulated descent of said trainer along a predetermined simulated glide path, means for affecting the indication of said indicator in one sense of indication actuated by said altitude-simulating means in accordance with the simulated rate of descent of said trainer, and means for simultaneously affecting the indication of said indicator in the opposite sense of indication actuated by said recorder in accordance with the simulated velocity of said aircraft, the resultant indication of said indicator representing the assumed departure in a vertical plane from said simulated glide path.

30. In a ground trainer instrument landing system, an aviation ground trainer for simulating flight of an aircraft, a reference surface, a course indicator movable relative to said reference surface with a velocity proportional to the simulated flight velocity of said aircraft and directionally controlled by said trainer, a means operable in accordance with the position of said course indicator relative to a point on said reference surface for indicating the assumed departure in a horizontal plane of said trainer relative to a simulated glide path aligned with a simulated landing runway, and means controlled in response to the simulated velocity and the instant simulated altitude of said trainer to indicate the simulated departure of said trainer in a vertical plane relative to said simulated glide path.

31. The structure as claimed in claim 30, in which the means to indicate the assumed position of said trainer in a vertical plane relative to said simulated glide path comprises an altitude-simulating means controlled by said trainer, indicating means for indicating the assumed position of said trainer in a vertical plane relative to said simulated glide path, means controlled by said altitude-simulating means for influencing said indicator to indicate in one direction of indication, and means responsive to the simulated velocity of said aircraft for simultaneously influencing said indicator to indicate in the opposite direction of indication to said one direction, the resultant indication representing the assumed departure of said trainer in the vertical plane from said simulated glide path.

32. A means for simulating descent of an aircraft along a predetermined glide path in an aviation ground trainer apparatus, comprising an aviation ground trainer for simulating flight of an aircraft, an air reservoir, the pressure therein being controlled by said trainer in a manner to simulate instant altitude of said trainer, an indicator for indicating the assumed departure in a vertical plane of said trainer relative to said glide path, and means jointly operative for actuating said indicator, including a pressure responsive device connected to said air reservoir, the rate of movement of said pressure responsive device being proportional to the simulated rate of descent of said trainer, and means responsive to the simulated velocity in flight of said aircraft along said glide path.

33. The structure as claimed in claim 32, in which the last-named means includes a course indicator movable relative to a supporting reference surface at a velocity proportional to the simulated velocity in flight of said aircraft.

34. The structure as claimed in claim 32, in which the indicator includes an electric circuit for energizing said indicator, a first variable resistance in said circuit for varying the electrical characteristics of said circuit, said first variable resistance being actuated by said pressure responsive means, and a second variable resistance for varying the electrical characteristics of said circuit, said second variable resistance being actuated by the means responsive to the simulated velocity in flight of said aircraft.

35. In an aviation ground training system, an aviation ground trainer for simulating the flight of an aircraft, a reference surface, a course recorder movable relative to said reference surface at a velocity proportional to the simulated velocity in flight of said aircraft and directionally controlled by said trainer, an electrical resistance on said reference surface substantially directionally aligned with a simulated landing runway on said surface, an altitude-simulating means actuated by said trainer, a second electrical resistance, means for varying said second electrical resistance actuated by said altitude-simulating means in accordance with the simulated instant rate of descent of said trainer, a contact carried by said course recorder to vary said first resistance at a rate proportional to the velocity of said course recorder relative to said reference surface, an electric power source, and an indicator—said first and second resistances and each of said resistance varying means being electrically connected to form an electric circuit, whereby when said first and said second resistances are varied in a predetermined instant ratio, said indicator indicates an assumed descent of said trainer along a predetermined glide path.

36. The structure as claimed in claim 35, in which said contact carried by said course recorder is a roller.

37. The structure as claimed in claim 35, in which said contact carried by said course recorder is a supporting roller for said course indicator.

38. The structure as claimed in claim 35, in which said first and said second resistances are connected in series with said electric power source and are simultaneously inversely varied with respect to each other.

39. The structure as claimed in claim 35, wherein said first resistance is formed as two connected spaced branches symmetrically disposed and parallel to the axis of said simulated runway on said reference surface.

40. The structure as claimed in claim 35, in which a plurality of marker beacon signal control switches are arranged at spaced points on said reference surface along the axis of said simulated landing runway, at least one of said switches being located adjacent said first resistance between the terminal ends thereof.

41. In an aviation ground training system for simulating instrument landings, an aviation ground trainer for simulating the flight of an aircraft, a reference surface, a course recorder movable relative to said reference surface at a velocity proportional to the simulated velocity in flight of said aircraft and directionally controlled by said trainer, a radiant energy signal transmitter, a radiant energy signal radiator connected to said transmitter and radiating a directional radiant energy signal field over said reference surface, a radiant energy signal pickup device carried by said course recorder, a radiant energy signal receiver mounted in said trainer and connected to said signal pickup device so that said receiver signals indicate departure of said trainer from a predetermined course aligned with a simulated landing runway, and means for indicating the assumed departure of said trainer in a vertical plane from a simulated glide path aligned with said simulated landing runway.

42. The structure as claimed in claim 41, in which the radiant energy signal transmitter and the radiant energy signal radiator are, respectively, a miniature low power radio signal transmitter and a directional radio antenna array.

43. The structure as claimed in claim 41, in which the radiant energy signal transmitter and the radiant energy signal radiator are, respectively, a miniature radio signal transmitter and a directional radio antenna array and in which said radiant energy signal pickup device and said radiant energy signal receiver are, respectively, a radio signal receiving antenna and a radio signal receiver.

44. The structure as claimed in claim 41, in which the means for indicating the assumed departure of said trainer in a vertical path from said simulated glide path comprises a means for simulating altitude controlled by said trainer, an indicator, an electric circuit for actuating said indicator, means controlled by said altitude simulating means for varying the electrical characteristics of said electrical circuit to actuate said indicator in accordance with the simulated rate of descent of said trainer, and means for simultaneously varying the electrical characteristics of said electrical circuit to actuate said indicator in accordance with the simulated horizontal velocity in flight of said aircraft.

45. The structure as claimed in claim 41, in which additional signalling apparatus is provided, comprising marker beacon signals mounted in said trainer, means for operating said marker beacon signals mounted on said reference surface at spaced aligned points, and means carried by said course recorder for actuating said marker beacon operating means.

46. In an instrument landing aviation ground training system, an aviation ground trainer for simulating aircraft flight; a reference supporting surface; a course recorder movable on said surface and adapted to be propelled over said surface at a rate proportional to the simulated velocity in flight of said aircraft and directionally controlled by said trainer; a miniature radio signal transmitter; an antenna array connected to said transmitter for radiating a directional electromagnetic signal field over said surface and having an origin at a point thereon; a radio signal pickup antenna carried by said course recorder; a radio signal receiver connected to said signal pickup antenna; a pair of connected electrical resistances symmetrically spaced with respect to the axis of a simulated landing runway terminating at said point on said surface; a contact device carried by said course recorder for varying said resistance; a second electrical resistance connected to said first resistance and said contact device; means to vary said second resistance, comprising an air reservoir, the pressure therein being controlled to simulate the instant simulated altitude of said trainer, a pressure responsive device responsive to the pressure within said reservoir, and a second contact device engaging said second resistance and actuated by said pressure responsive device; an indicator electrically connected to said resistances and said contact devices to form an electric circuit; an electric power source for energizing said circuit—said indicator indicating the assumed departure of said trainer in a vertical plane from a simulated glide path; and marker beacon simulating means, comprising a plurality of signal means mounted in said trainer, a plurality of switches, each connected to cause actuation of one of said signals, said switches being located at spaced points on said surface along said landing runway axis, and means carried by said course recorder for actuating said marker beacon switches.

47. In combination, an aviation ground trainer for simulating the flight of an aircraft; a reference surface; a course indicator movable relative to said surface at a velocity proportional to the simulated velocity of said aircraft and directionally controlled by said trainer; a means for generating a plurality of radiant energy fields, each having nondirectional radiation characteristics, each of said radiant energy fields being centrally disposed with reference to predetermined spaced points on said reference surface, said points being aligned with the axis of a simulated landing runway on said reference surface and representing radio compass transmitter stations; a directional radiant energy pickup means carried by said course indicator and adapted to cooperate with a selected one of said radiant energy fields; and a directional indicating device operatively connected to said pickup means and responsive to variations in the energy received by said radiant energy pickup means, whereby the directional heading of said course indicator relative to said simulated landing runway on said reference surface may be determined.

48. In a means for simulating instrument-directed flight of an aircraft, an aviation ground trainer for simulating said aircraft flight, a reference surface, a course indicator movable relative to said reference surface at a speed proportional to the simulated flight velocity of said aircraft and directionally controlled by said trainer, a means for establishing a non-directional radiant energy signal field relative to a point on said reference surface, a radio compass loop antenna carried by said indicator and movable therewith, a radio compass signal receiver connected to said loop antenna, and a radio compass indicator connected to said signal receiver and operative to indicate departure of said course indicator from a course directly toward said point on said reference table.

49. In a radio compass homing system for use in aviation ground trainers, a ground trainer, a reference surface, a course indicator movable relative to said reference surface at a speed proportional to the assumed flight velocity of said trainer, a radio compass signal receiving loop antenna rotatably mounted on said indicator, and means controlled by said trainer for simultaneously directionally controlling said relative motion of said course indicator and the plane of said radio compass loop antenna.

CARL J. CRANE.
GEORGE V. HOLLOMAN.
CARL W. MULLER.
RAYMOND K. STOUT.

REFERENCES CITED

The following references are of record in the file of this patent:

UNITED STATES PATENTS

| Number | Name | Date |
|---|---|---|
| 1,293,747 | Ford | Feb. 11, 1919 |
| 1,825,462 | Link | Sept. 29, 1931 |
| 2,070,178 | Pottenger | Feb. 9, 1937 |
| 2,099,857 | Link | Nov. 23, 1937 |
| 2,110,869 | Crane | Mar. 15, 1938 |
| 2,191,730 | Sjostrand | Feb. 27, 1940 |
| 2,226,726 | Kramer | Dec. 31, 1940 |

FOREIGN PATENTS

| Number | Country | Date |
|---|---|---|
| 484,243 | Great Britain | Feb. 22, 1937 |

OTHER REFERENCES

Air Corps News Letter, vol. 21, No. 6, March 15, 1938, pages 7 and 8.